United States Patent
Richards

(10) Patent No.: US 9,232,408 B2
(45) Date of Patent: Jan. 5, 2016

(54) REPORTING WIFI CHANNEL MEASUREMENTS TO A CELLULAR RADIO NETWORK

(71) Applicant: Telefonaktiebolaget L M Ericsson (Publ), Stockholm (SE)

(72) Inventor: Christopher Richards, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 392 days.

(21) Appl. No.: 13/741,473

(22) Filed: Jan. 15, 2013

(65) Prior Publication Data
US 2014/0199994 A1    Jul. 17, 2014

(51) Int. Cl.
*H04W 24/00*    (2009.01)
*H04W 36/00*    (2009.01)
H04W 24/10    (2009.01)
H04W 36/14    (2009.01)
H04W 48/12    (2009.01)

(52) U.S. Cl.
CPC .......... *H04W 24/00* (2013.01); *H04W 36/0088* (2013.01); *H04W 24/10* (2013.01); *H04W 36/14* (2013.01); *H04W 48/12* (2013.01)

(58) Field of Classification Search
CPC combination set(s) only.
See application file for complete search history.

(56) References Cited

U.S. PATENT DOCUMENTS

2012/0307744 A1    12/2012    Charbit et al.
2013/0088983 A1*    4/2013    Pragada et al. ............... 370/252

FOREIGN PATENT DOCUMENTS

WO    2009021009 A1    2/2009
WO    2011085238 A2    7/2011
WO    2013138708 A1    9/2013

OTHER PUBLICATIONS

3GPP TS 36.331 V9.4.0 (Sep. 2010), "3rd Generation Partnership Project; Technical Specification Group Radio Access Network; Evolved Universal Terrestrial Radio Access (E-UTRA); Radio Resource Control (RRC); Protocol Specification (Release 9)" consisting of 252 pages.
IEEE Computer Society; IEEE Standard for Information Technology—Telecommunications and Information Exchange Between Systems; Local and Metropolitan Area Networks; Specific Requirements; Part 11: Wireless LAN Medium Access Control (MAC) and Physical Layer (PHY) Specifications; Amendment 1: Radio Resource Measurement of Wireless LANs; IEEE Standard for 802.11k™-2008 (Amendment to IEEE Standard 802.11™-2007) dated Jun. 12, 2008 consisting of 244 pages.
Written Opinion of the International Preliminary Examining Authority dated Jan. 19, 2015 for International Application No. PCT/IB2013/061112, International Filing Date: Dec. 18, 2013 consisting of 5-pages.

(Continued)

*Primary Examiner* — Diane Mizrahi
(74) *Attorney, Agent, or Firm* — Christopher & Weisberg, P.A.

(57) ABSTRACT

A method and devices for providing measurements of WiFi network channels to a cellular radio network are disclosed. According to one aspect, the invention provides a method that includes preparing, at a node of the cellular radio network, a request for measurement of at least one WiFi channel. The measurement is to be provided by at least one user equipment having a WiFi transceiver and a cellular radio transceiver. The method includes transmitting, from the node of the cellular radio network, the request to the at least one user equipment. The node of the cellular radio network receives, from the at least one user equipment, at least one measurement of the at least one WiFi channel.

26 Claims, 5 Drawing Sheets

(56) References Cited

OTHER PUBLICATIONS

International Search Report and Written Opinion dated May 9, 2014 for International Application Serial No. PCT/IB2013/061112, International Filing Date: Dec. 18, 2013 consisting of 12-pages.

International Preliminary Report on Patentability, Form/PCT/IPEA/409, dated May 11, 2015 for corresponding International Application No. PCT/IB2013/061112; International Filing Date: Dec. 18, 2013, consisting of 9-pages.

* cited by examiner

US 9,232,408 B2

REPORTING WIFI CHANNEL MEASUREMENTS TO A CELLULAR RADIO NETWORK

TECHNICAL FIELD

The present invention relates to a method and devices for providing WiFi channel measurement reports to a cellular radio network.

BACKGROUND

WiFi, also termed WLAN, has become a ubiquitous wireless technology for data communication in the unlicensed radio spectrum. The Institute of Electrical and Electronic Engineers, IEEE, standard IEEE 802.11 defines the protocol stack and functions used by WiFi access points, APs. In the licensed radio spectrum $3^{rd}$ generation partnership project, long term evolution, 3GPP LTE, wireless communication technology is rapidly being deployed. LTE is the $4^{th}$ generation of wireless cellular communications. The protocol stack of LTE is currently defined by the 3GPP. The rapid increase in cellular data usage has prompted wireless operators to turn to using WiFi as a means to offload traffic from the congested licensed radio spectrum.

WiFi and cellular radio networks have traditionally by implemented and operated separately from one another. For example, FIG. 1 shows a known cellular radio network 10 and a known WiFi network 20. Each of networks 10 and 20 are independent of the other, even though coverage provided by each network 10 and 20 may overlap in some areas. The cellular radio network includes a plurality of base stations 12 that contain radios that communicate over a defined geographic area called a cell. The base stations 12 may be, for example, evolved Node B, eNB, base stations of an evolved Universal Terrestrial Radio Access Network, eUTRAN, or LTE network. The air interface of the base stations 12 may be orthogonal frequency division multiple access, OFDMA, on the downlink, and single carrier frequency division multiple access, SC-OFDMA, on the uplink.

Each base station 12 may be in communication with a serving gateway S-GW 14 using an S1 protocol. The S-GW 14 is a communication interface between the base stations 12 and the Internet and/or a backhaul network. As such S-GW 14 routes and forwards user data packets, while also acting as the mobility anchor for the user plane during inter-eNB handovers and as the anchor for mobility between LTE and other 3GPP technologies.

The base stations 12 are also in communication with a mobile management entity, MME, 16. The MME 16 is a control node for an LTE access-network. The MME 16 is responsible for idle mode UE 24, User Equipment, tracking and paging procedures including retransmissions. The MME 16 is involved in the bearer activation/deactivation process and is also responsible for choosing the S-GW 14 for a UE 24 at the UE's initial entry into the LTE network and at a time of intra-LTE handover.

The MME 16 is responsible for authenticating the user, for generation and allocation of temporary identities to UEs, for authorization of the UE 24 to camp on the service provider's Public Land Mobile Network (PLMN) and enforces UE roaming restrictions. The MME is the termination point in the network for ciphering/integrity protection for non-access stratum, NAS, signaling and handles security key management. Lawful interception of signaling is also supported by the MME 16. Further, the MME 16 also provides the control plane function for mobility between LTE and second generation/third generation, 2G/3G, access networks.

The WiFi network 20 includes wireless access points 22. Each WiFi access point functions as a communication interface between a user equipment 24, such as a computer, and the Internet. The coverage of one or more (interconnected) access points—called hotspots—can extend from an area as small as a few rooms to as large as many square miles. Coverage in the larger area may require a group of access points with overlapping coverage.

Cellular radio networks, such as the communication network 10, and the WiFi network 20 utilize two independent radio air interfaces and networks, each with their own operations, administration and management, OAM, infrastructure. Since the two network architectures are separated, the ability to perform fast and reliable mobility (handoff) of subscriber data sessions between the two networks is severely limited. For example, seamless roaming from LTE to WiFi and back without loss of data packets is a hugely complex task with today's separate networks.

The vast majority of smartphone devices now manufactured include both 3GPP cellular (3G and 4G) and WiFi capabilities. These user equipment 24 have separate radio and protocol stacks for each technology (termed dual stack or dual radio). Both wireless technologies operate simultaneously and independently. There is no method for the cellular radio network to know the radio status of the WiFi link. As such, the cellular radio network cannot make any admission, mobility or load balancing decisions with respect to use of the WiFi link.

SUMMARY

The present invention advantageously provides a method and devices for providing measurements of WiFi network channels to a cellular radio network. According to one aspect, the invention provides a method that includes preparing, at a node of the cellular radio network, a request for measurement of at least one WiFi channel. The measurement is to be provided by at least one user equipment having a WiFi transceiver and a cellular radio transceiver. The method includes transmitting, from the node of the cellular radio network, the request to the at least one user equipment. The node of the cellular radio network receives, from the at least one user equipment, at least one measurement of the at least one WiFi channel.

According to this aspect, in some embodiments, the measurement is a received signal strength indication, RSSI. In some embodiments, the measurement is a received channel power indication, RCPI, and the method further includes converting the RCPI into units of at least one of dBm and mW. In some embodiments, the node of the cellular radio network is a long term evolution, LTE, base station. In some embodiments, the method may further include performing, at the node of the cellular radio network, a power saving function based on the at least one measurement, the power saving function including instructing a user equipment cellular radio transceiver to enter a sleep mode. In some embodiments, the method includes performing, at the node of the cellular radio network, a WiFi network mapping function based on the at least one measurements. The network mapping function may include creating a list of WiFi channels accessible by at least one user equipments. The method may further comprise performing, at the node of the cellular radio network, a user equipment handoff function based on the at least one measurement. The user equipment handoff function may include discontinuing allocation of a cellular radio network channel to a user equipment. In some embodiments, the method includes comparing, at the node of the cellular radio network, at least one measurement to at least one threshold to determine when a WiFi channel quality is greater than a cellular radio channel quality.

According to another aspect, the invention provides a cellular radio network node configured to process signals compatible with a cellular radio network protocol. The cellular radio network node includes a memory, a cellular radio transceiver and a processor. The memory is configured to store an identification of at least one user equipment. The memory is further configured to store at least one measurement of a WiFi channel received from at least one of the at least one user equipment. The cellular radio receiver is configured to send the request for measurement of at least one WiFi channel to the at least one identified user equipment. The cellular radio receiver is further configured to receive from the at least one identified user equipment at least one WiFi channel measurement. The processor is in communication with the memory and the cellular radio transceiver and is configured to generate the request for measurement. The processor is further configured to cause the cellular radio transceiver to send the request for measurement of at least one WiFi channel to the at least one identified user equipment. The processor is further configured to cause the memory to store the at least one measurement of the WiFi channel received from the at least one of the at least one user equipment.

According to this aspect, in some embodiments, the processor is further configured to perform a power saving function based on the at least one WiFi channel measurement. The power saving function may include causing the cellular radio transceiver to send an instruction to a user equipment cellular radio transceiver to enter a sleep mode. The processor may further be configured to perform a WiFi network mapping function. The network mapping function may include creating a list of WiFi channels accessible by at least one user equipments. In some embodiments, the processor is further configured to perform a user equipment handoff function. In some embodiments, the request for measurement specifies at least one WiFi channel to be measured. The specified at least one WiFi channel is selected from a list of WiFi channels reported by a user equipment. In some embodiments, the processor is embedded in a radio resource controller of a long term evolution, LTE, base station.

According to yet another aspect, the invention provides a user equipment having a cellular radio unit to receive a request from a cellular radio base station requesting the user equipment to measure at least one WiFi channel, and to transmit to the cellular radio base station a report having the measurement of the at least one WiFi channel. The user equipment also includes a WiFi transceiver configured to receive signals from a WiFi access point, and to process the received signals to determine a measurement of at least one WiFi channel. The user equipment also includes an interface to facilitate communications between the cellular radio unit and the WiFi transceiver.

According to this aspect, in one embodiment, the report having the measurement is generated in the WiFi transceiver, and in another embodiment the report having the measurement is generated in the cellular radio unit. In some embodiments, the report having the measurement includes a list of at least one WiFi channel received by the user equipment, each one of the at least one WiFi channel associated with a different measurement. In some embodiments, the request includes a list of WiFi channels to be measured.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
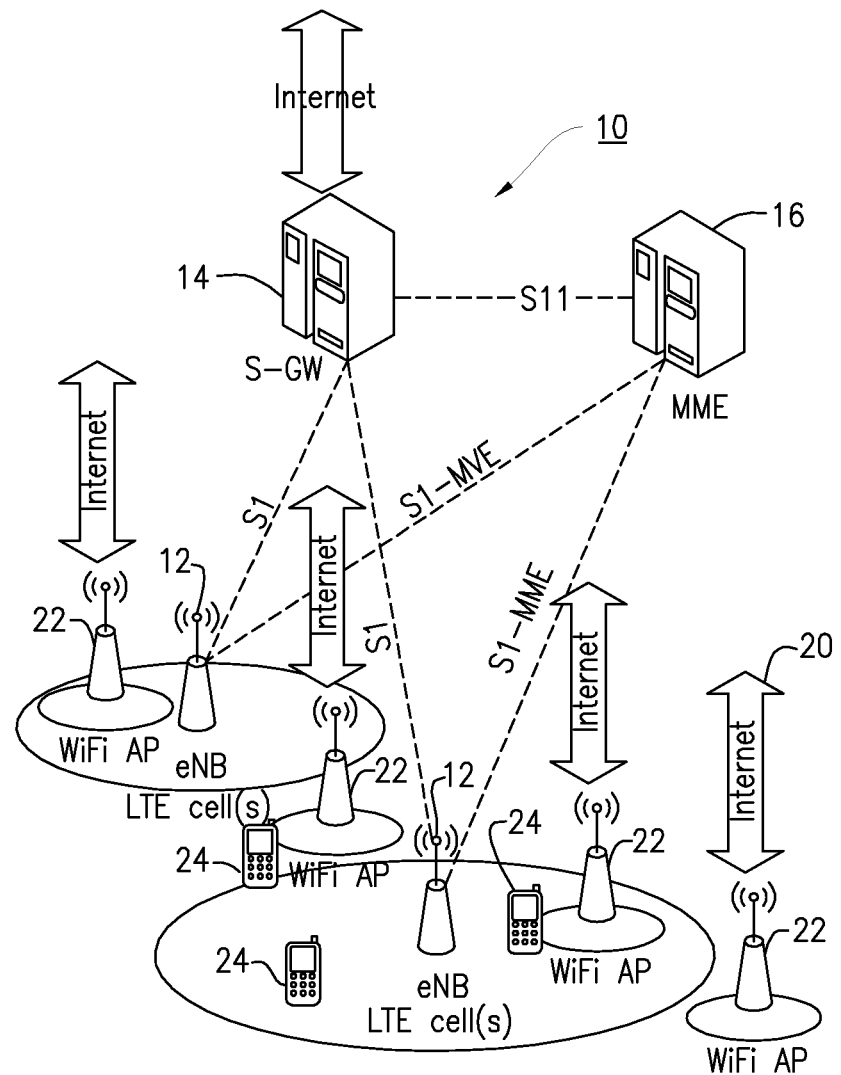
FIG. 1 is a block diagram of known cellular radio network and a known WiFi network.

Before describing in detail exemplary embodiments that are in accordance with the present invention, it is noted that the embodiments reside primarily in combinations of apparatus components and processing steps related to providing WiFi channel measurement reports to a cellular radio network. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Of note, although the description herein references cellular radio and WiFi, the invention is not limited to such. It is contemplated that communications based unlicensed or licensed communication technologies can be used for one or both of the cellular radio and WiFi technologies described herein.

As used herein, relational terms, such as "first" and "second," "top" and "bottom," and the like, may be used solely to distinguish one entity or element from another entity or element without necessarily requiring or implying any physical or logical relationship or order between such entities or elements.

Since one of the motivations of supplementing cellular radio network capacity with WiFi is to autonomously offload data traffic, the network nodes that must make the decision to move end user sessions from one network to another currently should have means of determining the ability of the other network node to receive the offloaded traffic. In particular, to ascertain whether to handoff LTE traffic to the WiFi network, the LTE eNB should have information about the channel quality of links between one or more WiFi access points and user equipment.

Figure 2:
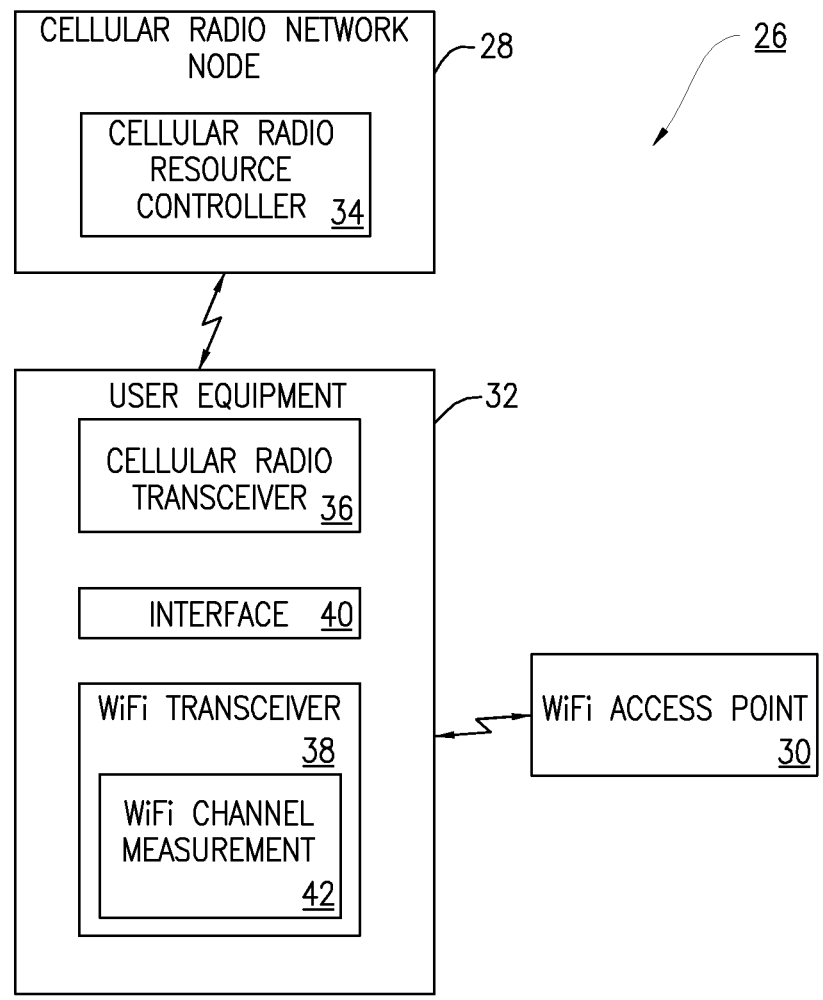
FIG. 2 is a block diagram of a communication system having a cellular radio network node, a WiFi access point, and a user equipment constructed in accordance with principles of the present invention.

Returning now to the drawing figures, there is shown in FIG. 2 a block diagram of a communication system 26 having a cellular radio network node 28, a WiFi access point 30, and a user equipment 32 constructed in accordance with principles of the present invention. The cellular radio network node can be, for example, a 3GPP node, such as a long term evolution, LTE, base station. The cellular radio network node 28 includes a radio resource controller 34 that handles control plane signaling between the user equipment 32 and the cellular radio network. Functions of the radio resource controller 34 may include establishing and releasing a connection between the UE 32 and another entity, such as another user equipment in the network or another caller from a land line.

The functions of the radio resource controller 34 may also include broadcasting system information, mobility functions such as admission and handoff, paging notification, UE authentication, OAM functions, and power control.

In particular, the radio resource controller 34 may function to prepare a request for measurement of at least one WiFi channel, transmit the request to at least one user equipment 32 and receive from the at least one user equipment 32 at least one measurement of the at least one WiFi channel. Further, the cellular radio resource controller 34 may perform functions of mapping a WiFi network. Such mapping may include determining an identification of WiFi access points within and without a cell associated with the cellular radio network node, and channels associated with each identified WiFi access point.

The user equipment, UE, 32 includes a cellular radio transceiver 36 to communicate wirelessly with the cellular radio network node 28, a WiFi transceiver 38 to communicate with the WiFi access point 30, and an interface 40 to facilitate communication between the cellular radio transceiver 36 and the WiFi transceiver 38. The WiFi transceiver 38 includes a WiFi channel measurement unit 42 to generate WiFi channel measurements.

In operation, the cellular radio resource controller 34 of the cellular radio network node 28 prepares a request for measurement of at least one WiFi channel. The preparation of the request may be performed periodically, or in response to a determination that traffic is to be offloaded to the WiFi network, or in the event of admission of a user equipment to the cellular radio network, or in the event of facilitating a handoff of a user equipment 32 from the cellular radio network to the WiFi network. The request may include a list of WiFi channels, i.e., frequencies, for which the channel measurements are to be taken. For example, the list of channels may be selected from a list of WiFi channels reported by a UE. Alternatively, or in addition, the request may include a list of one or more UEs 32 whose WiFi links are to be measured. Alternatively, or in addition, the request may specify a list of one or more WiFi access points whose downlink channels to one or more UEs are to be measured. The request may further include an instruction to one or more UEs 32 to perform a channel measurement for one or more of the channels of the WiFi network.

The request prepared by the cellular radio resource controller 34 is sent by the cellular radio network node 28 to one or more UEs 32. The cellular radio transceiver 36 receives the request and demodulates and decodes the request. The WiFi transceiver 38, if not already activated, is now activated. The request is sent to the WiFi transceiver 38 via the interface 40. The WiFi transceiver 38 receives and processes the request. For instance, the WiFi transceiver 38 may identify a WiFi channel specified by the request and retrieve a previously determined channel quality indicator for the specified channel. Alternatively, the WiFi transceiver 38 may initiate a transmission on the uplink of the channel to one or more WiFi access point 30 and receive one or more responsive downlink signals on the specified channels from the one or more WiFi access points 30. The WiFi channel measurement unit 42 may then perform a measurement of channel quality based on each received downlink signal. A channel measurement may be performed for each of a plurality of channels. The channel measurement may be one of a channel quality indicator, CQI, a received signal strength indication, RSSI, a received channel power indicator, RCPI, or other channel measurement. The RCPI may be converted to dBm or mW. This conversion may be performed in the cellular radio network node or in the user equipment.

The channel measurements are sent via the interface 40 from the WiFi transceiver 38 to the cellular radio transceiver 36. In some embodiments, the channel measurements may be assembled into a report by one of the WiFi receiver 38 and the cellular radio transceiver 36. The cellular radio transceiver 36 sends a channel measurement report to the cellular radio resource controller 34. The cellular radio resource controller 34 may use the channel measurement report for one or more purposes. For example, the channel measurement report may be used to determine which one or more of a plurality of UEs is to be handed off to one or another WiFi access point. If the cellular radio resource controller 34 determines that a UE 32 is to be handed off, the cellular radio resource controller 34 may terminate a cellular radio connection to the UE 32 to be handed off. A condition for determining if a UE 32 is to be handed off to the WiFi network may be a threshold to which the channel measurement is compared. For example, if a first channel measurement of a first channel exceeds a threshold, a decision may be made to handoff a UE 32 corresponding to the first channel to the WiFi access point to which the channel corresponds.

Figure 3:
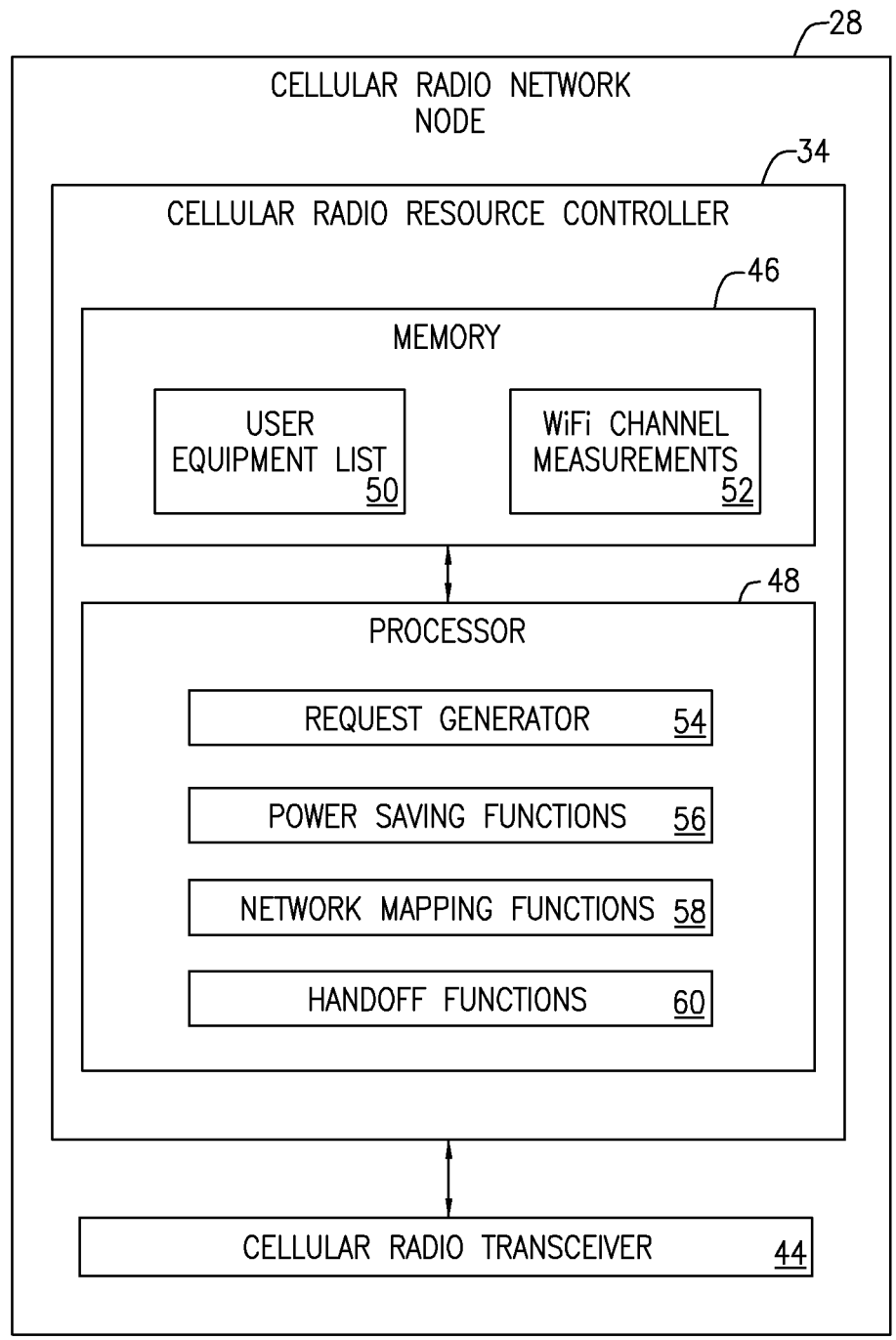
FIG. 3 is a block diagram of a cellular radio network node constructed in accordance with principles of the present invention.

FIG. 3 is a more detailed block diagram of the cellular radio network node 28 of FIG. 2. The cellular radio network node 28 includes the cellular radio resource controller 34 and a cellular radio transceiver 44. The radio resource controller 34 includes a memory 46 and a processor 48. The memory 46 stores a UE list 50 and WiFi channel measurements 52. In some embodiments, the memory 46 may store additional data, such as identities of a plurality of WiFi access points and the channels associated with each WiFi access point. The memory may also store locations of the WiFi access points and/or an indication whether a WiFi access point is within or without a cell associated with the cellular radio network node 28.

The processor 48 performs functions related to control of radio resources of the cellular radio network node 28. For example, the processor 48 includes a request generator 54 that generates requests for WiFi channel measurements. The requests may specify one or more WiFi channels to be measured. The WiFi channels may be associated with one or more UEs and/or one or more WiFi access points.

The processor 48 may also initiate power saving functions 56. For example, the power saving functions 56 may include instructions to power down the cellular radio transceiver 36 and/or the WiFi transceiver 38. A power down instruction to power down a UE's WiFi transceiver 42 may be generated in response to a determination that a WiFi channel used by the UE 32 is of poor quality. As another example, a power down instruction to power down a UE's cellular radio transceiver may be generated in response to a determination that a WiFi channel used by the UE 32 is strong. Thus, the power saving functions 56 may instruct one or both of the cellular radio transceiver 36 and the WiFi transceiver 38 to enter a sleep mode.

The processor 48 may also initiate WiFi network mapping functions 58. Such mapping may include 1) determining an identification of WiFi access points within and without a cell associated with the cellular radio network node, 2) determining channels associated with each identified WiFi access point, 3) determining UEs in communication with each WiFi access point, 4) generating a list of WiFi channels accessible by one or more UEs, and/or 4) determining a channel quality for each WiFi channel associated with each UE and each WiFi access point.

The processor 48 may also initiate handoff functions 60. Such handoff functions may include 1) determining that quality of a cellular radio channel to which a UE is assigned has dropped below a threshold, and/or 2) determining that quality of a WiFi channel to which a UE is assigned is above a threshold, and 3) terminating the UE's use of the cellular radio channel. Additional coordination between the WiFi network and the cellular radio network to complete a handoff is beyond the scope of this disclosure.

The cellular radio transceiver 44 of the cellular radio network node 28 sends a request for measurement of at least one WiFi channel to at least one UE 32, and receives from the at least one UE 32 at least one WiFi channel measurement.

Figure 4:
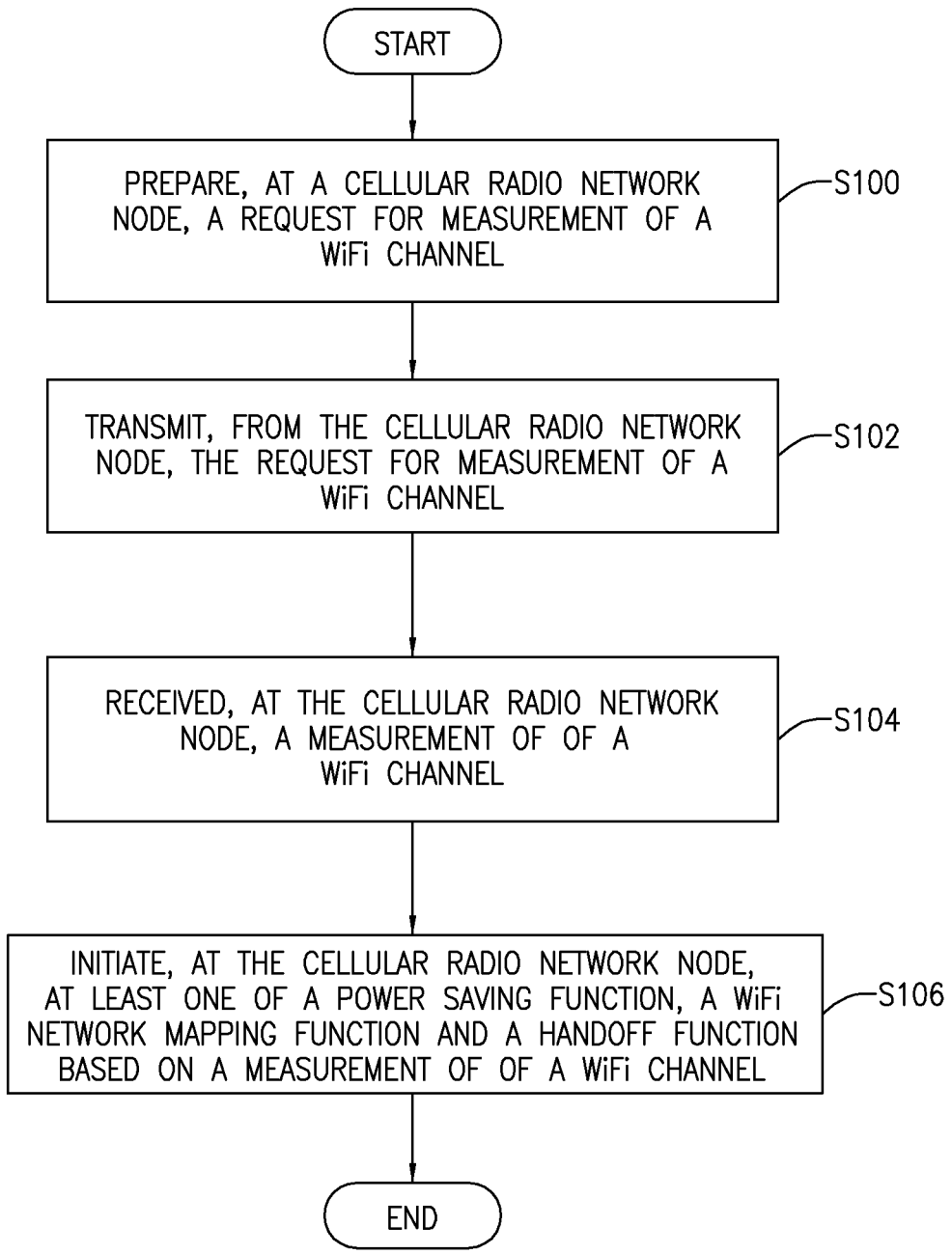
FIG. 4 is a flowchart of an exemplary process for acquisition of WiFi channel measurements by a cellular radio network node.

FIG. 4 is a flowchart of an exemplary process for acquisition of WiFi channel measurements by a cellular radio network node 28. The process includes preparing, at the cellular radio network node 28, a request for measurement of a WiFi channel (block S100). The request for measurement of the WiFi channel is transmitted from the cellular radio network node 28 (block S102). A measurement of the WiFi channel is received at the cellular radio network node 28 from a UE 32 that received the request (block S104). At least one of a power saving function, a WiFi network mapping function and a handoff function, as described above, is initiated at the cellular radio network node 28 based on a measurement of a WiFi channel (block S106).

Figure 5:
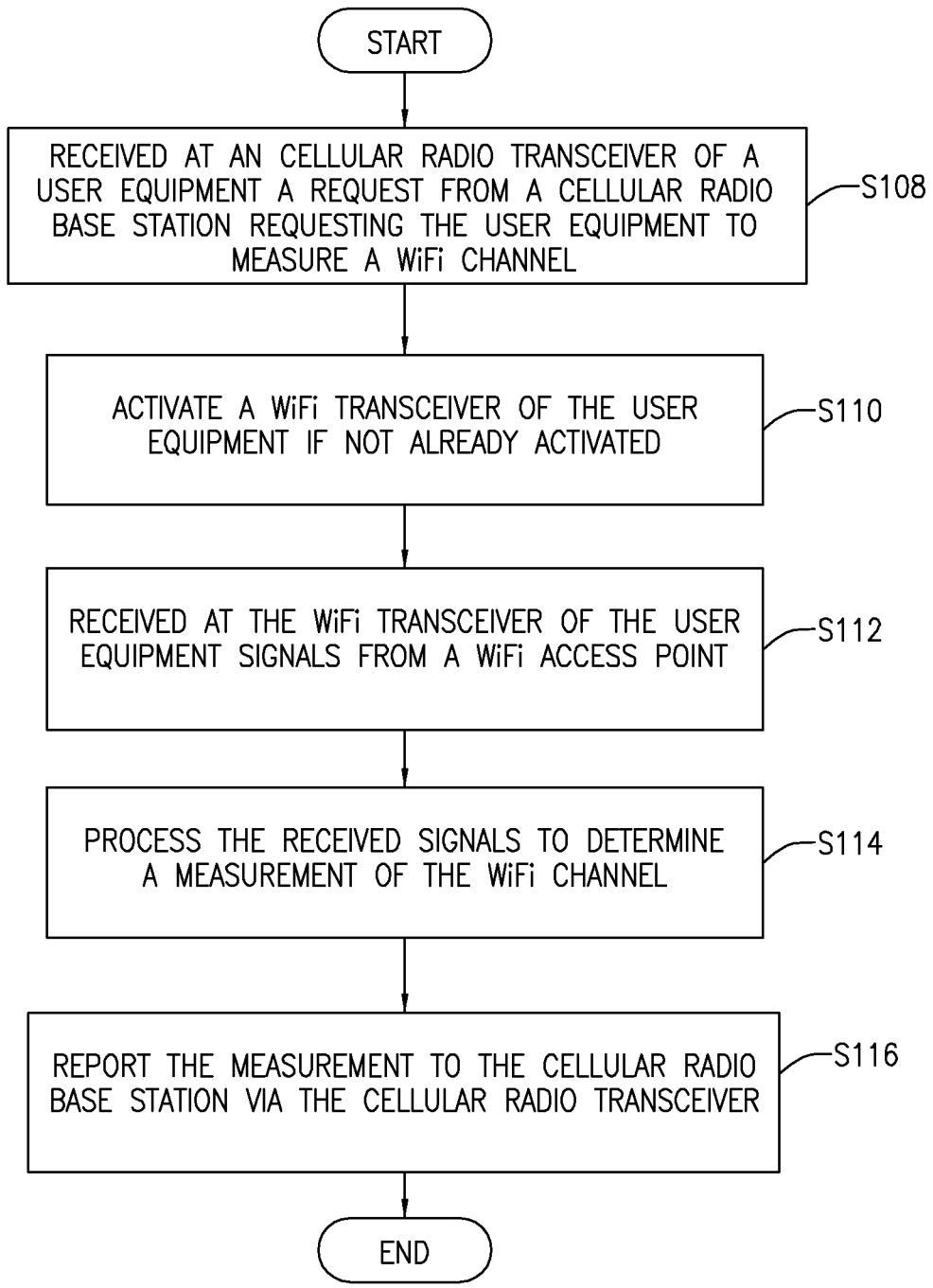
FIG. 5 is a flowchart of an exemplary process for acquiring and transmitting a channel measurement at a user equipment in response to a request from a cellular radio network node.

An exemplary process for acquiring and transmitting a channel measurement at a user equipment in response to a request from a cellular radio network node is described with reference to FIG. 5. A request for a measurement of a WiFi channel is received by a cellular radio transceiver 36 of a UE 32 from a cellular radio network node 28 (block S108). A WiFi transceiver of the user equipment is activated if not already activated (block S110). Signals from a WiFi access point 30 are received at a WiFi transceiver 38 of the UE 32 (block S112). The signals are processed to determine a measurement of the channel (block S114). The measurement is reported to the cellular radio network node 28 via the cellular radio transceiver 36 of the UE 32 (block S116).

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of providing measurements of one or more channels of a WiFi network to a cellular radio network, the method comprising:
   preparing, at a node of the cellular radio network, a request for measurement of at least one WiFi channel, the measurement to be provided by at least one user equipment having a WiFi transceiver and a cellular radio transceiver;
   transmitting, from the node of the cellular radio network, the request to the at least one user equipment; and
   receiving, at the node of the cellular radio network, from the at least one user equipment, at least one measurement of the at least one WiFi channel.

2. The method of claim 1, wherein the measurement is a received signal strength indication, RSSI.

3. The method of claim 1, wherein the measurement is a received channel power indication, RCPI, the method further comprising converting the RCPI into units of at least one of decibel per milliwatt, dBm, and milliwatt, mW.

4. The method of claim 1, wherein the node of the cellular radio network is a long term evolution, LTE, base station.

5. The method of claim 1, further comprising performing, at the node of the cellular radio network, a power saving function based on the at least one measurement, the power saving function includes instructing a user equipment cellular radio transceiver to enter a sleep mode.

6. The method of claim 1, further comprising performing, at the node of the cellular radio network, a WiFi network mapping function based on the at least one measurements, the network mapping function include creating a list of WiFi channels accessible by at least one user equipments.

7. The method of claim 1, further comprising performing, at the node of the cellular radio network, a user equipment handoff function based on the at least one measurements.

8. The method of claim 7, wherein the user equipment handoff function includes discontinuing allocation of a cellular radio network channel to a user equipment.

9. The method of claim 1, further comprising comparing, at the node of the cellular radio network, the at least one measurement to at least one threshold to determine when a WiFi channel quality is greater than a cellular radio channel quality.

10. A cellular radio network node configured to process signals compatible with a cellular radio network protocol, the cellular radio network node comprising:
    a memory configured to store:
      an identification of at least one user equipment; and
      at least one measurement of a WiFi channel received from at least one of the at least one user equipment;
    a cellular radio transceiver configured to:
      send the request for measurement of at least one WiFi channel to the at least one identified user equipment; and
      receive from the at least one identified user equipment at least one WiFi channel measurement; and
    a processor in communication with the memory and the cellular radio transceiver, the processor configured to;
      generate the request for measurement;
      cause the cellular radio transceiver to send the request for measurement of at least one WiFi channel to the at least one identified user equipment; and
      cause the memory to store the at least one measurement of the WiFi channel received from the at least one of the at least one user equipment.

11. The cellular radio network node of claim 10, wherein the processor is further configured to perform a power saving function based on the at least one WiFi channel measurement, the power saving function includes causing the cellular radio transceiver to send an instruction to a user equipment cellular radio transceiver to enter a sleep mode.

12. The cellular radio network node of claim 10, wherein the processor is further configured to perform a WiFi network mapping function, the network mapping function including creating a list of WiFi channels accessible by at least one user equipments.

13. The cellular radio network node of claim 10, wherein the processor is further configured to perform a user equipment handoff function.

14. The cellular radio network node of claim 10, wherein the request for measurement specifies at least one WiFi channel to be measured.

15. The cellular radio network node of claim 14, wherein the specified at least one WiFi channel is selected from a list of WiFi channels reported by a user equipment.

16. The cellular radio network node of claim 10, wherein the processor is embedded in a radio resource controller of a long term evolution, LTE, base station.

17. A user equipment, comprising:
a cellular radio unit configured to:
receive a request from a cellular radio base station requesting the user equipment to measure at least one WiFi channel; and
transmit to the cellular radio base station a report having the measurement of the at least one WiFi channel; and
a WiFi transceiver configured to;
receive signals from a WiFi access point; and
process the received signals to determine a measurement of at least one WiFi channel; and
an interface to facilitate communications between the cellular radio unit and the WiFi transceiver.

18. The user equipment of claim 17, wherein the report having the measurement is generated in the WiFi transceiver.

19. The user equipment of claim 17, wherein the report having the measurement is generated in the cellular radio unit.

20. The user equipment of claim 17, wherein the report having the measurement includes a list of at least one WiFi channel received by the user equipment, each one of the at least one WiFi channel associated with a different measurement.

21. The user equipment of claim 17, wherein the request includes a list of WiFi channels to be measured.

22. A method for a user equipment to provide measurements of one or more channels of a WiFi network to a cellular radio network, the method comprising:
receiving, at a cellular radio unit, a request from a cellular radio base station requesting the user equipment to measure at least one WiFi channel;
transmitting, from the cellular radio unit to the cellular radio base station, a report having the measurement of the at least one WiFi channel;
receiving, at a WiFi transceiver, signals from a WiFi access point;
processing the received signals to determine a measurement of at least one WiFi channel; and
facilitating communications between the cellular radio unit and the WiFi transceiver.

23. The method of claim 22, further comprising generating the report having the measurement in the WiFi transceiver.

24. The method of claim 22, further comprising generating the report having the measurement in the cellular radio unit.

25. The method of claim 22, wherein the report having the measurement includes a list of at least one WiFi channel received by the user equipment, each one of the at least one WiFi channel associated with a different measurement.

26. The method of claim 22, wherein the request includes a list of WiFi channels to be measured.

* * * * *